ELECTRIC DELAY DEVICE EMPLOYING SEMICONDUCTORS

Filed Oct. 20, 1949 4 Sheets-Sheet 1

INVENTOR
ALEC H. REEVES
BY
Robert Harding Jr.
ATTORNEY

Oct. 13, 1953 A. H. REEVES 2,655,607

ELECTRIC DELAY DEVICE EMPLOYING SEMICONDUCTORS

Filed Oct. 20, 1949 4 Sheets-Sheet 2

INVENTOR
ALEC H. REEVES
BY Robert Harding Jr.
ATTORNEY

INVENTOR
ALEC H. REEVES
BY Robert Harding Jr.
ATTORNEY

Oct. 13, 1953 A. H. REEVES 2,655,607

ELECTRIC DELAY DEVICE EMPLOYING SEMICONDUCTORS

Filed Oct. 20, 1949 4 Sheets-Sheet 4

INVENTOR
ALEC H. REEVES
BY Robert Harding Jr.
ATTORNEY

Patented Oct. 13, 1953 2,655,607

UNITED STATES PATENT OFFICE 2,655,607

ELECTRIC DELAY DEVICE EMPLOYING SEMICONDUCTORS

Alec Harley Reeves, London, England, assignor to International Standard Electric Corporation, New York, N. Y., a corporation of Delaware Application October 20, 1949, Serial No. 122,396
In Great Britain October 27, 1948

16 Claims. (Cl. 307—88)

The present invention relates to electric pulse delay and counting circuits employing semi-conductors.

It is well known that a suitable semi-conducting material (which may be of several different types) may be provided with a metal contact point or "catswhisker" by means of which it operates as a rectifier. One of the earliest materials used in this way was a crystal of galena (lead sulphide). A more recently used material is germanium.

It has also been known for a long time that some at least of these rectifying crystals could be made to oscillate when suitably biassed and provided with an appropriate circuit, and this is due to the fact that the current-voltage characteristic has a region of negative slope over which the voltage across the contact decreases when the current increases, so that the crystal behaves like a negative resistance.

It has further been found more recently that a suitably treated crystal of germanium may be provided with two metal point contacts or "catswhiskers" arranged very close together (but not in actual contact), and then by suitable circuit arrangements the crystal can be made to operate like an amplifier of which the input circuit is between one contact and the base on which the crystal is mounted, and the output circuit is between the other contact and the base. A crystal provided in this way with two catswhisker electrodes and operated so that it amplifies will be called for convenience a "crystal triode."

It should be made clear also that the crystal triode does not involve the negative resistance property of a suitably biassed crystal rectifier (with one point contact) already mentioned above, but depends for its action on a different phenomenon, so that the two applications of the crystal should be carefully distinguished. Although germanium is an example of a material which can be adapted to both applications it does not follow that all semi-conducting crystals can be so adapted.

The behaviour of semi-conducting crystals is, however, not fully understood, and when they are used as crystal triodes the feature of practical importance is the nature of the rectifying property of the crystal when contact is made by a catswhisker electrode. By suitable treatment of the germanium it is possible to produce a crystal with P-type or N-type rectification properties. A germanium surface is said to have P (or N) type rectification properties when, operated as a simple rectifier with one catswhisker, the low resistance condition is produced when the catswhisker is positive (N-type) or negative (P-type) to the base in which the crystal is mounted.

Crystal triodes can be produced from a germanium crystal of either type, though the polarisation of the electrodes is different in the two types. In the case of the present specification, the crystal triodes will be assumed to be of the kind using germanium with N-type rectification properties, though the other type could also be used if the electrode polarising arrangements are suitably modified. In the case of a crystal triode, the input contact point or electrode is called the emitter electrode, and the output contact point or electrode is called the collector electrode. In the case of a N-type germanium crystal, the emitter is polarised a fraction of a volt positively to the base, while the collector is polarised negatively to the base by perhaps 20 volts.

The invention provides an electric pulse delay circuit comprising a semi-conducting material having a base electrode, and also in contact with its surface at least two point-contact electrodes, a trigger circuit associated with each point contact electrode, means for applying an electric pulse to operate one trigger circuit, and means for deriving a delayed pulse from the other trigger circuit, the arrangement being such that the operation of the first-mentioned trigger circuit transmits a coupling pulse over the semi-conducting surface which influences the other trigger circuit to cause spontaneous operation thereof after a delay depending on the separation of the electrodes.

According to another aspect, the invention provides an electric pulse counting circuit comprising a semi-conducting material having a base electrode, and also a plurality of point contact electrodes spaced apart in contact with its surface, a trigger circuit associated with each point contact electrode, means for applying a train of pulses to all the trigger circuits, means for predisposing a particular one of the trigger circuits to be operated first by a given one of the pulses, the arrangement being such that the operation of each trigger circuit transmits over the semi-conducting surface a coupling pulse which predisposes the adjacent trigger circuit to be operated by the next following pulse in such manner that the trigger circuits are operated in turn by successive pulses, and means for deriving an output pulse from one of the trigger circuits.

The invention will be described with reference to the accompanying drawings in which:

Fig. 4 is a simple pulse delay circuit;

Fig. 5 is a pulse counting circuit;

Fig. 6 shows a modification of Fig. 5;

Fig. 7 is a cyclic pulse counting circuit;

In the electric pulse delay circuits of the present invention, germanium crystals are used, operating as rectifiers exhibiting the negative resistance effect, or operating as crystal triodes with two metal point contacts.

Figures 1, 2, 3, 4, 5, 6:
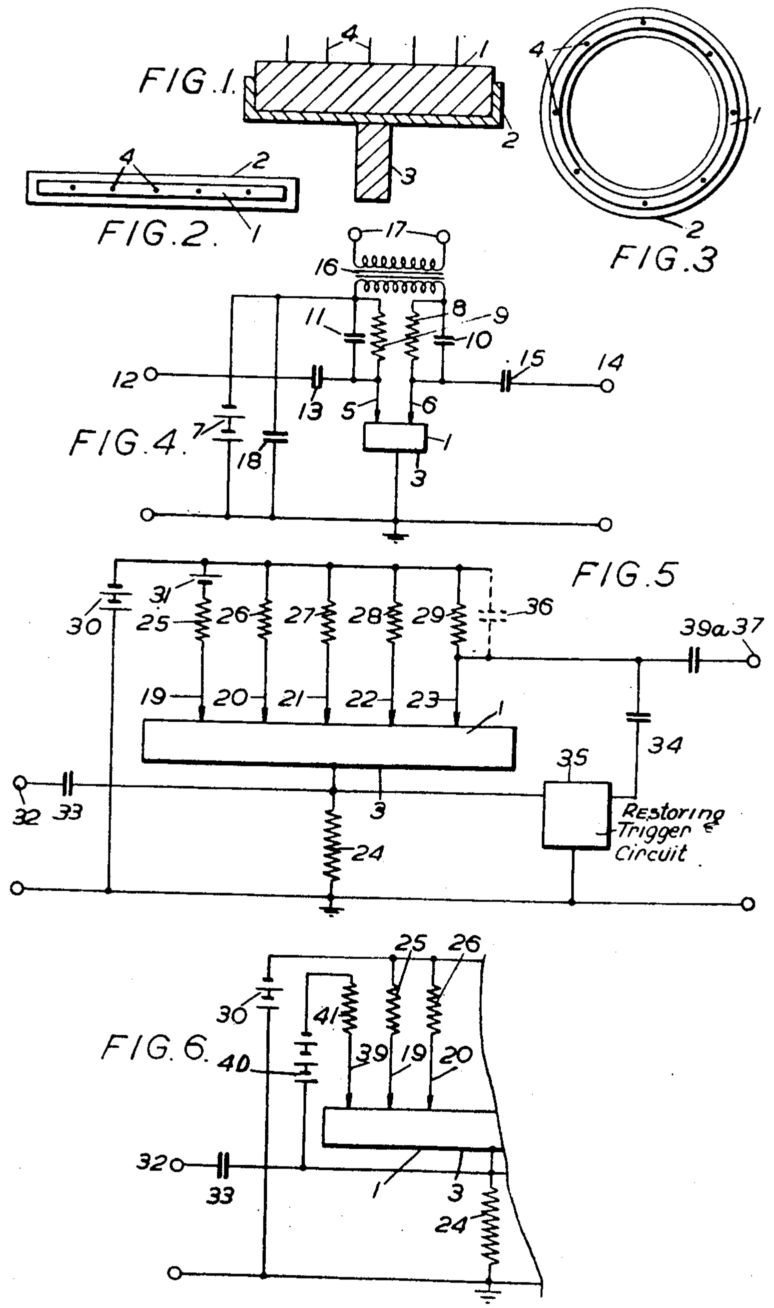
Fig. 1 shows a sectional view of a semi-conducting crystal device employed in the circuits of the present invention.
Fig. 2 shows a top view of the device.
Fig. 3 shows a top view of a crystal device in annular form.
Figs. 4 to 7 (inclusive) show circuits according to the invention employing the negative resistance properties of a germanium crystal arranged to form two or more rectifiers.

The germanium crystal device, which is used in the embodiments of the invention, is shown in Figs. 1 and 2. It consists of a germanium crystal 1, preferably in the form of a thin plate, soldered or otherwise firmly secured in a metal base or holder 2 having a terminal shank 3. A number of fine wire electrodes or catswhiskers 4 are arranged in a row in contact with the upper edge of the plate. There may be any number of such electrodes from two upwards. When circuits involving crystal triodes are used, each catswhisker electrode shown in Figs. 1 and 2 will be replaced by a pair of electrodes placed very close together. In certain applications, the germanium crystal may be in the form of a thin annulus secured in an annular holder as shown in Fig. 3. In the circuit diagram which follows, the crystal is conventionally shown as a rectangular block, and the catswhisker electrodes are shown with arrowheads. In the simplest arrangement according to the invention, shown in Fig. 4, the crystal 1 is provided with two metal contacts or catswhiskers 5 and 6. These are, however, not the two electrodes of a crystal triode, but constitute two separate rectifiers on the same crystal and are both biassed to the center of the negative resistance region. A single bias source 7 is connected with its positive terminal to the base 3 on which the crystal is mounted, and its negative terminal through separate resistances 8, 9 to the two electrodes, the resistances being shunted respectively by condensers 10, 11. This produces two simple self restoring trigger circuits of the kind described in the specification of co-pending U. S. application of John West Harling for "Circuits Including Negative Resistance Devices" Serial No. 106,027 filed July 21, 1949, now U. S. Patent No. 2,565,497 issued August 28, 1951. A negative input pulse applied at terminal 12 through a condenser 13 to the electrode 5 causes the circuit associated therewith to trigger and restore itself. It has been shown experimentally that the change in current through the electrode 5, produces an effect on the second electrode 6, whereby if the associated circuit is adjusted so that it is in the negative resistance condition, the current flowing through the electrode 6 is increased so that the associated circuit is caused to trigger and then to restore itself. Some influence appears to travel through the surface of the crystal from the electrode 5 to the electrode 6, which for convenience will be called a "coupling pulse" without implying any particular mechanism, since the effect is not fully understood.

The germanium crystal is preferably in the form of a thin strip or ring in order to reduce the tendency to lateral spreading of the coupling pulse.

An output pulse may then be obtained from terminal 14 through a condenser 15 from the second electrode 6 after a delay which may be of the order of a few microseconds and which depends on the rate of travel of the coupling pulse, and on the spacing of the electrodes, 5 and 6.

The delay will also depend on the potential applied to the electrode 6, and so if the secondary winding of a transformer 16 be connected in series between the source 7 and resistance 8 as shown, a signal wave may be supplied to terminals 17 connected to the primary winding of the transformer. A decoupling condenser 18 should preferably be included as shown. If a train of regularly repeated input pulses be applied to terminal 12, then the corresponding output pulses obtained from terminal 14 will be phase modulated in accordance with the signal wave.

This principle may be extended in the manner shown in Fig. 5 to obtain a counting circuit which produces one output pulse in response to a train of any specified number of input pulses.

The germanium crystal 1, is provided with five metal point contacts or catswhiskers 19, 20, 21, 22, 23 arranged in a straight line. The base 3 is connected to ground through an impedance 24 which might be a resistance or an inductance, and the contacts are respectively connected through resistances 25 to 29 to the negative terminal of the grounded direct current source 30 the potential of which is adjusted so that each contact is operating near the center of the negative resistance region of the characteristic. An additional small biassing source 31 is connected in series with the first contact 19 only. It will thus be seen that each contact has associated with it a simple trigger circuit of the kind described in the specification already mentioned. Although five catswhisker electrodes have been shown, it will be understood that there could be any number.

A train of positive input pulses is applied at terminal 32 connected through a condenser 33 to the base 3. The pulse amplitude should be just insufficient to trigger any of the circuits except the first one, which has a slightly greater bias than the others. However, when this first circuit has been triggered, a coupling pulse is produced by the first electrode 19 and travels towards the second electrode 20 whose triggering voltage is effectively lowered thereby so that it can be triggered by the second pulse. A coupling pulse produced by the second electrode 20 then causes the third electrode 21 to be triggered by the third pulse, and so on, until the *n*th electrode is triggered by the *n*th pulse. This *n*th electrode is connected through a condenser 34 to a self-restoring trigger circuit 35 of any suitable type which delivers a negative pulse to the base 3 of sufficient amplitude to restore all the trigger circuits connected with the catswhisker electrodes.

A single large negative output pulse may then be obtained from terminal 37 connected through condenser 39a to the electrode 23, corresponding to $n$ input pulses. The circuit having been restored to normal, the $(n+1)$th pulse then triggers the first electrode 19 again and the process is repeated. It will be seen that the counting circuit described is a pulse frequency divider which divides by the number of electrodes on the germanium crystal.

Fig. 6 shows a minor modification of the left-hand side of Fig. 5. As a means of control of the counter, an additional auxiliary metal contact 39 may be provided which is arranged to be biassed separately from the other contacts from a source 40 through a resistance 41. The contact 39 is arranged to pass a constant current and to be unaffected by the input pulses. This auxiliary contact 39 provides a constant coupling influence and may be used to predispose the first contact 19 to be triggered by the first pulse, so that the additional small bias source 31 shown in Fig. 5 for contact 19 is not required, and is not shown in Fig. 6.

Figure 7:
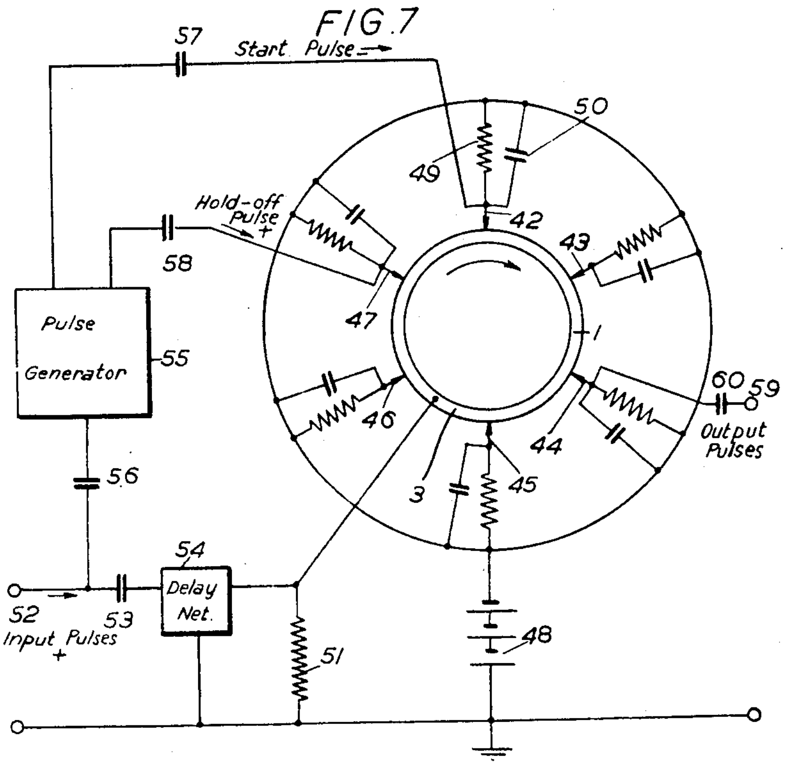

According to another variation of this arrangement shown in Fig. 7, the germanium crystal 1 is in the form of a narrow ring as shown in Fig. 3 with $n$ contacts arranged symmetrically round it. Actually six contacts are shown in Fig. 7, designated 42 to 47 (inclusive).

Each contact has associated with it a self-restoring trigger circuit as shown in Fig. 7, whose theory of operation is fully described in the U. S. Patent No. 2,565,497 already referred to. The contact 42 is connected to the negative terminal of a grounded source 48 through a resistance 49 shunted by a condenser 50, all the other contacts being connected exactly similarly. The base 3 is connected to ground through a lead resistance 51.

Positive input pulses are applied from terminal 52 to the base 3 through a condenser 53 and delay network 54. Each circuit is triggered by an input pulse and then restores to normal.

Figure 8:
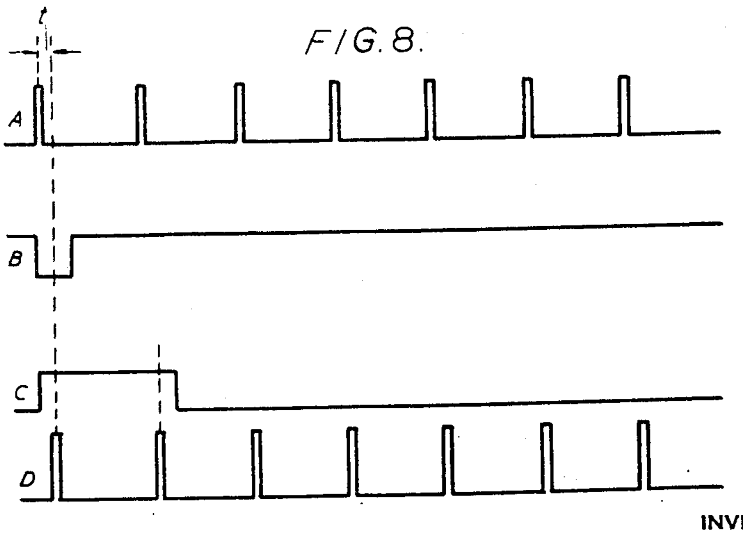
Fig. 8 shows graphs of pulses used to explain the operation of Fig. 7.

It will be clear that the circuits will be triggered in turn around the ring as long as input pulses are supplied, once triggering has been started in a particular direction. In order, therefore, to start the operation in the clockwise direction, for example, two auxiliary pulses are generated by a pulse generator 55 operated through a condenser 56 by the first pulse of the input pulse train, which is shown at A, Fig. 8. The first auxiliary pulse, shown at B, Fig. 8, is a short negative "start" pulse which is applied through a condenser 57 to the electrode 42 at which the count is to be started, and the second is a long positive "hold-off" pulse shown at C, Fig. 8 which is applied to the preceding electrode 47 in the anti-clockwise direction through a condenser 58. The start pulse predisposes the triggering of the electrode 42 at which the count is to start, and the hold-off pulse, which should have a duration slightly greater than the time interval separating two of the input pulses, prevents the triggering of the first electrode 47 in the anti-clockwise direction by either of the first two input pulses. Thus the triggering is started in the desired clockwise direction and continues in that direction as long as input pulses are supplied.

In order that the pulses B and C may be applied before the first input pulse is applied to the base 3, the input pulses are slightly delayed in the delay network 54, and appear as shown at D, Fig. 8. The delay $t$ should be about half the duration of the start pulse B, and the hold-off pulse should just overlap the first two input pulses as shown.

An output pulse may be obtained from a terminal 59 connected to any one of the electrodes, such as 44, through a condenser 60, and then one output pulse will be obtained for each rotation of the triggering action. The circuit is thus a pulse frequency divider which divides by the number of electrodes on the crystal.

The pulse generator 55 should be designed according to known principles to produce one pulse B and one pulse C in response to the first input pulse of a device, it being thereafter rendered inoperative until the series of input pulses has ceased. Several ways of effecting this will occur to those skilled in the art.

A similar series of delay and counting circuits may be produced by the use of a single germanium crystal with two or more pairs of contacts, each pair being operated as a crystal triode, with an associated trigger circuit.

Figure 9:
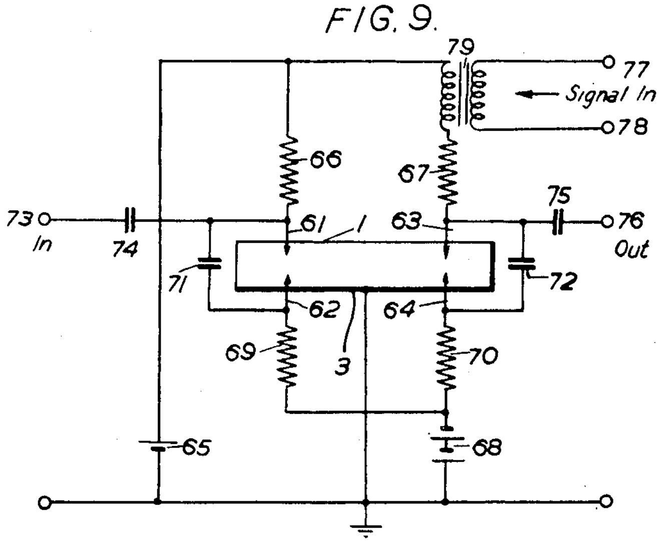
Figs. 9, 10 and 11 show circuits similar to Figs. 4, 5 and 7 respectively, but employing a germanium crystal arranged to form two or more crystal triodes.

Fig. 9 shows a simple circuit of this kind, corresponding to Fig. 4.

As already stated, it will be assumed that the germanium crystal has N-type rectification properties, but the other type may be used, if the signs of the polarising potentials are reversed.

In Fig. 9, the crystal 1 is provided with two pairs of catswhisker electrodes 61, 62 and 63, 64, the emitter electrodes being 61 and 63, and the collector electrodes being 62 and 64. A grounded positive bias source 65 of one or two volts potential is connected to the emitter electrodes 61 and 63 through corresponding resistances 66 and 67, and a grounded negative potential source 68 of about 50 volts is connected to the collector electrodes 62 and 64 through corresponding resistances 69 and 70, and the emitter electrodes 61 and 63 are respectively connected to the corresponding collector electrodes 62 and 64 through condensers 71 and 72. The base 3 of the crystal is grounded, and the arrangement forms two separate circuits each of which tends to oscillate. By suitable choice of the circuit elements and polarizing voltages, oscillations can just be prevented, and then each circuit forms a self-restoring trigger circuit. However, if a positive input pulse be applied through terminal 73 and condenser 74 to the emitter electrode 61, the corresponding circuit will be triggered and a coupling pulse will be transmitted along the surface layer of the crystal towards the second pair of electrodes 63 and 64, and with suitable adjustments will cause the second trigger circuit to operate spontaneously after a delay of a few microseconds, depending on the rate of travel of the coupling pulse, and the separation of the pairs of electrodes. Thus a delayed pulse may be obtained from the second emitter electrode 63 through condenser 75 and output terminal 76.

As a modification, each trigger circuit may be connected as a blocking oscillator, by replacing the resistances in series with the two electrodes respectively by the windings of a transformer, and omitting the condensers 71 and 72, the circuit being adjusted so that it is just not oscillating.

As in the case of Fig. 4 if a train of regularly repeated input pulses is applied to terminal 73 the delayed output pulses obtained from terminal 76 may be phase modulated by applying an input signal wave at terminals 77 and 78 through a transformer 79 having its secondary winding connected in series with the second emitter electrode 63.

Figure 10:
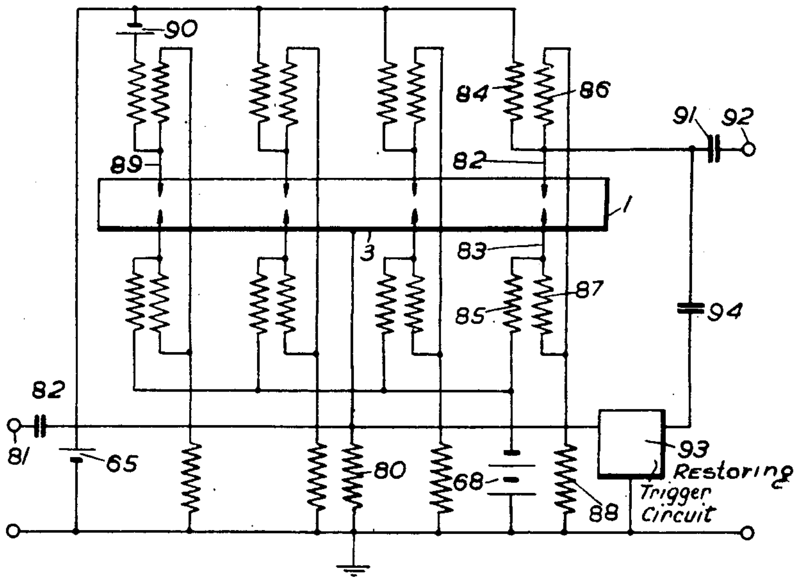

Fig. 10 shows a pulse counting circuit similar to Fig. 5 except that any number $n$ pairs of catswhisker electrodes, arranged to operate as crystal triodes, are used. Fig. 10 shows four such pairs of electrodes. Each pair of electrodes has associated with it a trigger circuit similar to those shown in Fig. 9, except that the condenser corresponding to 71 and 72 are omitted, so that the trigger circuits are not self-restoring.

In Fig. 10, the base 3 of the crystal 1 is connected to ground through a load impedance 80, which may be a resistance or an inductance, and negative input pulses are applied at terminal 81 to the base 3 through a condenser 82. The last pair of electrodes 82 (emitter) and 83 (collector) are respectively connected to the polarising sources 65 and 66 through resistances 84 and 85, and also through individual resistances 86 and 87 and a common resistance 88 to ground. All the other pairs of electrodes are similarly provided, but the first emitter electrode 89 has an additional bias source 90 connected in series therewith in order to predispose the first trigger circuit to be operated by the first input pulse, as in the case of Fig. 5. The last emitter electrode 82 is connected through a condenser 91 to an output terminal 92.

When the first trigger circuit has been operated by the first of the $n$ pulses, the coupling pulse produced then predisposes the second trigger circuit to be operated by the second pulse, and so on until by the arrival of the $n$th pulse, all have been operated, and an output pulse can be obtained from terminal 92. A self-restoring trigger circuit 93 connected to the last emitter electrode 82 through a condenser 94 provides a pulse which is applied to the base 3 to restore all the other trigger circuits to normal, as in the case of Fig. 5. One output pulse for every $n$th input pulse will be obtained from the output terminal 92.

Figure 11:
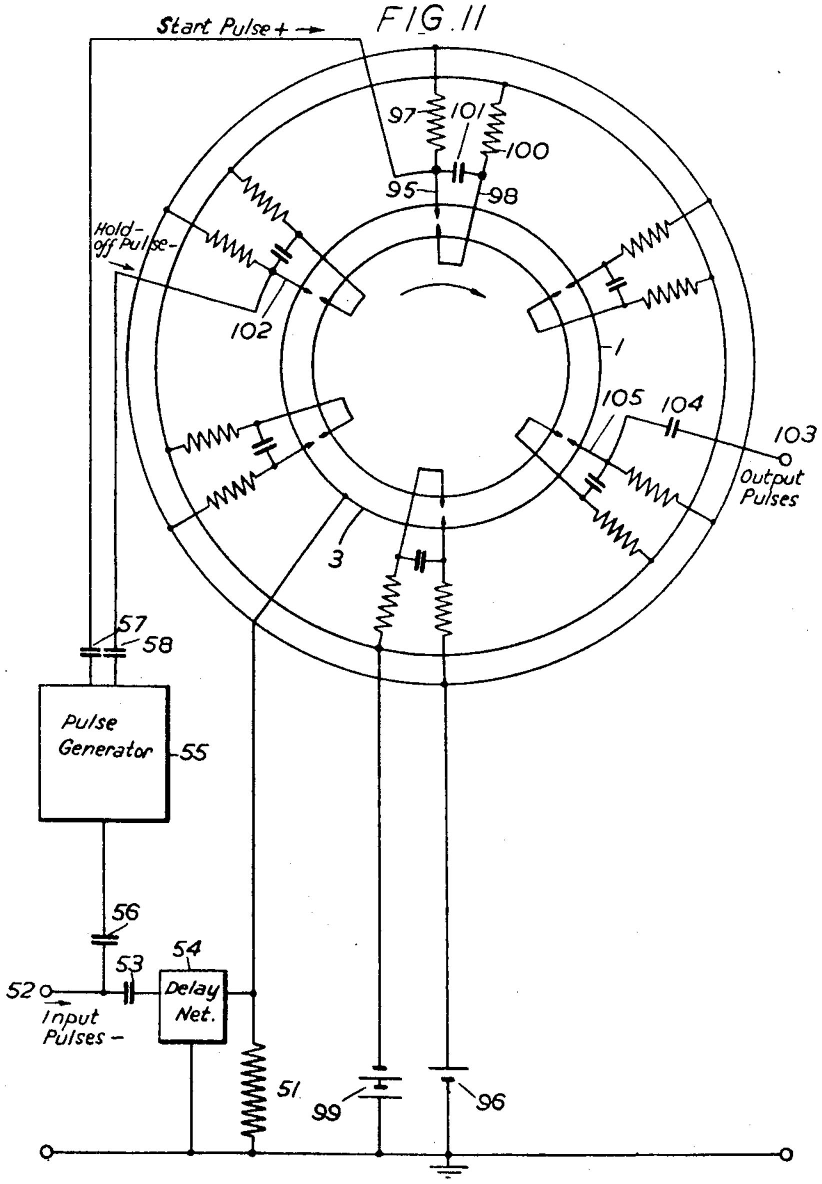

Fig. 11 shows a continuously operating circular counting circuit on similar lines to Fig. 7, but employing self-restoring trigger circuits of the type shown in Fig. 9. Six pairs of catswhisker electrodes are equally spaced around an annular crystal of the kind shown in Fig. 3, but it will be understood that there may be any number of such pairs.

Taking the pair of electrodes where the count is to start, the emitter electrode 95 is connected to the positive bias source 96 through a resistance 97 and the corresponding collector electrode 98 is connected to the negative bias source 99 through a resistance 100, and to the emitter electrode through a condenser 101. All the other pairs of electrodes are connected in a similar manner.

Fig. 11 includes elements 51 to 58 arranged exactly in the same way as in Fig. 7, in order to provide the necessary start and hold-off pulses, except that these pulses must be of the opposite sign since the input pulses applied to terminal 52 must be negative instead of positive. Fig. 8 can be used to represent all the pulses concerned in Fig. 11 if all the pulses shown are inverted.

Condenser 57 is connected to the emitter electrode 95, and condenser 58 is connected to the preceding emitter electrode 102 in the anti-clockwise direction. An output terminal 103 is connected through a condenser 104 to any one of the emitter electrodes, such as 105.

As in the case of Fig. 7, the positive start pulse applied to electrode 95 in response to the first negative input pulse predisposes the corresponding self-restoring trigger circuit to be operated, and the negative hold-off pulse applied to electrode 102 prevents the trigger circuit connected thereto from being operated by either of the first two input pulses. The operation of the first-mentioned trigger circuit produces the coupling pulse which predisposes the next trigger circuit in the clockwise direction to be operated by the second input pulse, and so on around the ring, as explained with reference to Fig. 7. One output pulse will be obtained from terminal 103 for every $n$ input pulse, where $n$ is the number of pairs of electrodes on the germanium crystal.

It will be understood that although germanium has been mentioned as the semi-conducting material for the crystal, other materials might be used.

While the principles of the invention have been described above in connection with specific examples, and particular modifications thereof, it is to be clearly understood that this description is made only by way of example and not as a limitation on the scope of the invention.

What is claimed is:

1. An electric pulse delay circuit comprising a semi-conducting material having a base electrode, and also in contact with its surface at least two point-contact electrodes, a plurality of trigger circuits, each trigger circuit including one of the point contact electrodes, means for applying an electric pulse to operate one trigger circuit, and means for deriving a delayed pulse from another trigger circuit, the arrangement being such that the operation of the first mentioned trigger circuit transmits a coupling pulse over the semi-conducting surface which influences said other trigger circuit to cause spontaneous operation thereof after a delay depending on the separation of the electrodes.

2. An electric pulse counting circuit comprising a semi-conducting material having a base electrode, and also a plurality of point contact electrodes spaced apart in contact with its surface, a plurality of trigger circuits, each trigger circuit including one of said point contact electrodes, means for applying a train of pulses to all the trigger circuits, means for predisposing a particular one of the trigger circuits to be operated first by a given one of the pulses, the arrangement being such that the operation of each trigger circuit transmits over the semi-conducting surface a coupling pulse which predisposes the adjacent trigger circuit to be operated by the next following pulse in such manner that the trigger circuits are operated in turn by successive pulses, and means for deriving an output pulse from one of the trigger circuits.

3. A circuit according to claim 1 comprising a germanium crystal having two point contact electrodes providing two rectifiers, means for biassing each rectifier so that it operates in the negative resistance region of the characteristic, and a self-restoring trigger circuit associated with each rectifier.

4. A circuit according to claim 1 comprising a germanium crystal having two pairs of point contact electrodes, means for biassing each pair of electrodes in such manner that they operate as a crystal triode, and a self restoring trigger circuit associated with each crystal triode.

5. A circuit according to claim 4 comprising means for applying a train of regularly repeated pulses to operate periodically one of the trigger circuits, means for applying a signal wave to vary the bias of an electrode associated with the other trigger circuit, and means for deriving a phase modulated train of pulses from the said other trigger circuit.

6. A circuit according to claim 2 in which an impedance is connected in series with the base electrode and in which the train of pulses is applied to the said base electrode.

7. A circuit according to claim 6 in which the electrodes are arranged in a line, the trigger circuits being of the kind which do not restore themselves after operation, comprising means controlled by the trigger circuit which is operated last for restoring all the trigger circuits to normal.

8. A circuit according to claim 7 in which the said means comprises an additional self-restoring trigger circuit separate from the first-mentioned trigger circuits, and adapted on operation by a pulse from the last operated trigger circuit to supply a pulse to the said base electrode for restoring all the trigger circuits to normal.

9. A circuit according to claim 6 in which the electrodes are arranged in a line, and in which only the last of the trigger circuits is of the self-restoring type, the arrangement being such that the last trigger circuit on operation by a pulse restores itself and also all the other trigger circuits.

10. An arrangement according to claim 2 in which the means for predisposing a particular one of the trigger circuits comprises means for supplying to an electrode associated with the particular trigger circuit a bias larger than that applied to the corresponding electrode connected with the other trigger circuits.

11. An arrangement according to claim 2 in which the means for predisposing a particular one of the trigger circuits comprises an additional point contact electrode placed in contact with the surface of the semi-conducting material near an electrode associated with the particular trigger circuit, and means for supplying a current through the additional electrode in such manner that the said current is unaffected by the applied pulses.

12. An arrangement according to claim 6 in which the semi-conducting material is of annular form, and in which the electrodes are equally spaced around the annular edge of the material.

13. An arrangement according to claim 12 in which all the trigger circuits are of the self-restoring type.

14. An arrangement according to claim 13 comprising means for applying a start pulse to predispose the particular trigger circuit to be operated by the given pulse, and means for applying a hold-off pulse to one of the trigger circuits associated with an adjacent electrode to prevent that trigger circuit from being operated by the given pulse or by the next following pulse, whereby the pulse count is made to take place cyclically in a given direction around the ring.

15. An arrangement according to claim 2 comprising a germanium crystal having a plurality of point contact electrodes each operated as a rectifier, and means for biassing each rectifier in such manner that it operates in the negative resistance region of the characteristic.

16. An arrangement according to claim 2 comprising a germanium crystal having a plurality of pairs of point contact electrodes and means for biassing each pair of electrodes in such a manner that they operate as a crystal triode.

ALEC HARLEY REEVES.

References Cited in the file of this patent

UNITED STATES PATENTS

| Number | Name | Date |
|---|---|---|
| 2,306,386 | Hollywood | Dec. 29, 1942 |
| 2,476,323 | Ruck | July 19, 1949 |
| 2,486,391 | Cunningham | Nov. 1, 1949 |
| 2,502,488 | Shockley | Apr. 4, 1950 |
| 2,517,960 | Barney et al. | Aug. 8, 1950 |
| 2,531,076 | Moore | Nov. 21, 1950 |
| 2,533,001 | Eberhard | Dec. 5, 1950 |

OTHER REFERENCES

"Design & Use of Directly Coupled Pentode Trigger Pairs," by Regener, from R. S. I., vol. 17, No. 5, May 1946, pages 180–184.

"Decade Counting Circuits," by Regener, from R. S. I., vol. 17, No. 5, May 1946, pages 185–189.

"Electric Counters," by Grosdoff, from R. C. A. Review, vol. 7, No. 3, September 1946, pages 438–447.

"The Transistor A Semi-Conductor Triode" by Bardeen et al., from Physical Review, for July 15, 1948, pages 230–233.

"Eclipse of the Radio Tube," from Radio Craft for September 1948, pages 24–25.

"Some Novel Circuits for the Three Terminal Semiconductor Amplifier," by Webster et al. R. C. A. Review, vol. 10, No. 1 for March 1949, pages 5 to 16.